Oct. 21, 1958 V. H. HERRMEYER 2,856,645
TRAILER HOUSE
Filed Jan. 19, 1956 2 Sheets-Sheet 1

Inventor
Vernon H. Herrmeyer
by M. Talbert Dick
Attorney

Witness
Edward P. Seeley

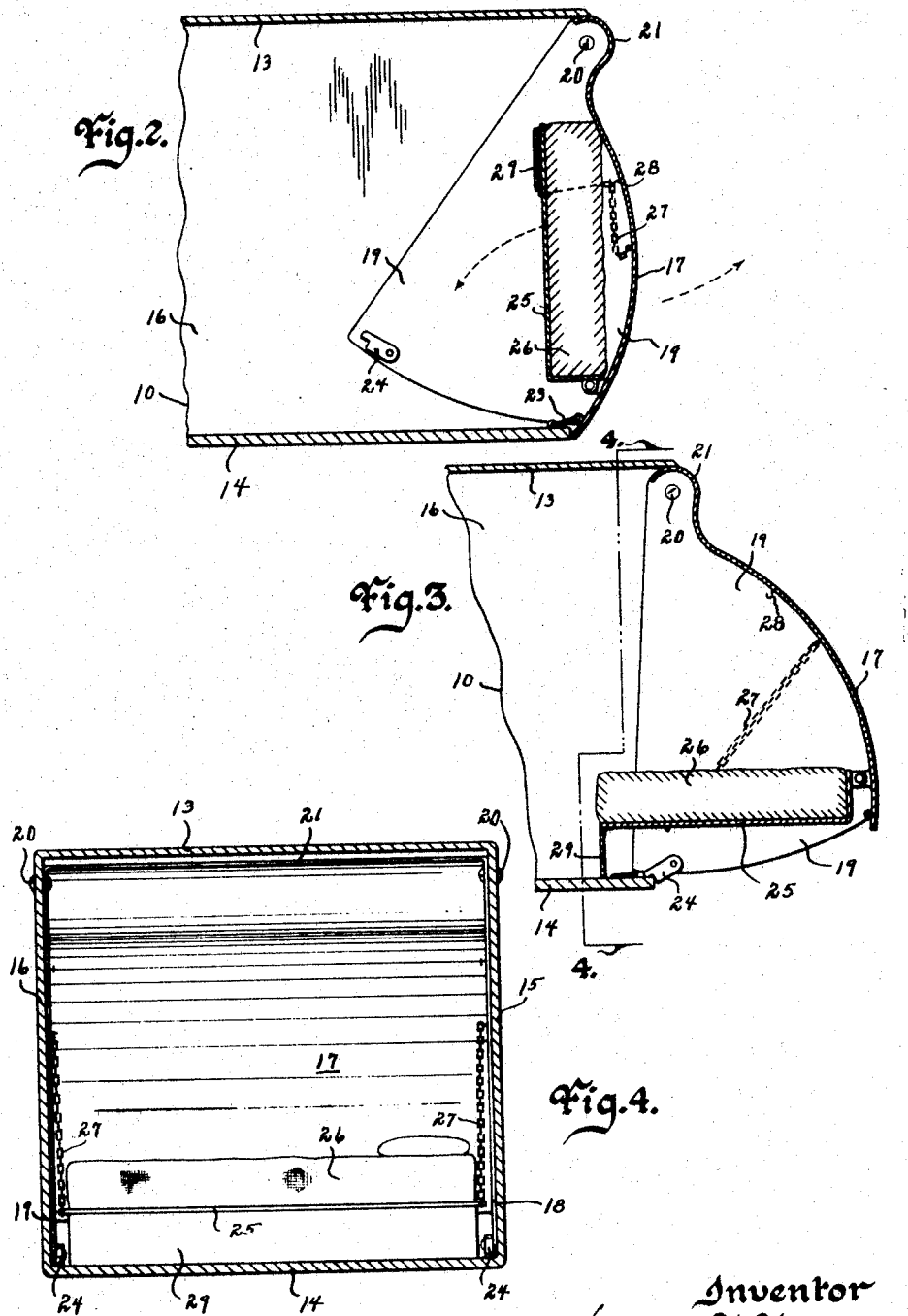

United States Patent Office 2,856,645
Patented Oct. 21, 1958

2,856,645

TRAILER HOUSE

Vernon H. Herrmeyer, Waterloo, Iowa

Application January 19, 1956, Serial No. 560,141

9 Claims. (Cl. 20—2)

This invention relates to trailer houses and more particularly to a construction that permits the expanding of the same when not in movement and the contraction of the unit during transportation.

The use of trailer houses is now universal. However, due to highway restrictions they are seriously limited as to size. While all countries have maximum dimensions as to lengths, heights, and widths, some countries provide more limitations than others. England, especially, due to its narrow road nets, seriously limits the length of house trailers, and therefore, some activity is occurring to render the house longitudinally expandable at point of destination. In this country inventors have attempted to telescope the sides of the house and even provide a collapsible second story. While such efforts are an advancement in the art, they have many shortcomings. In every instance, the collapsible portion of the trailer house requires considerable space in the house proper when it is contracted. This objectionably interferes with fixtures, furniture and like, normally in the house proper as well as installations in the part that is capable of folding, telescoping or like, into the main housing.

Therefore, one of the principal objects of my invention is to provide a trailer house that has an extendable end that requires little if any space within the main housing when in collapsed condition.

A further object of this invention is to provide a collapsible trailer house end that permits an escape passageway when in extended position.

A still further object of my invention is to provide a trailer house having an expandable end that is easily and quickly operated.

A still further object of this invention is to provide an expandable portion on a trailer house that has a substantial vertical space area.

A still further object of my invention is to provide an expandable trailer house that may be mounted on a relatively short vehicle chassis.

Still further objects of my invention are to provide an expandable trailer house that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 2 is a vertical sectional view of the collapsible end portion of my house trailer showing the same in a retracted position, Fig. 3 is a vertical sectional view of the collapsible end portion of my device showing the same in an expanded condition, and Fig. 4 is a cross sectional view of the expandable trailer house taken on line 4—4 of Fig. 3, and more fully illustrates its construction.

Figure 1:
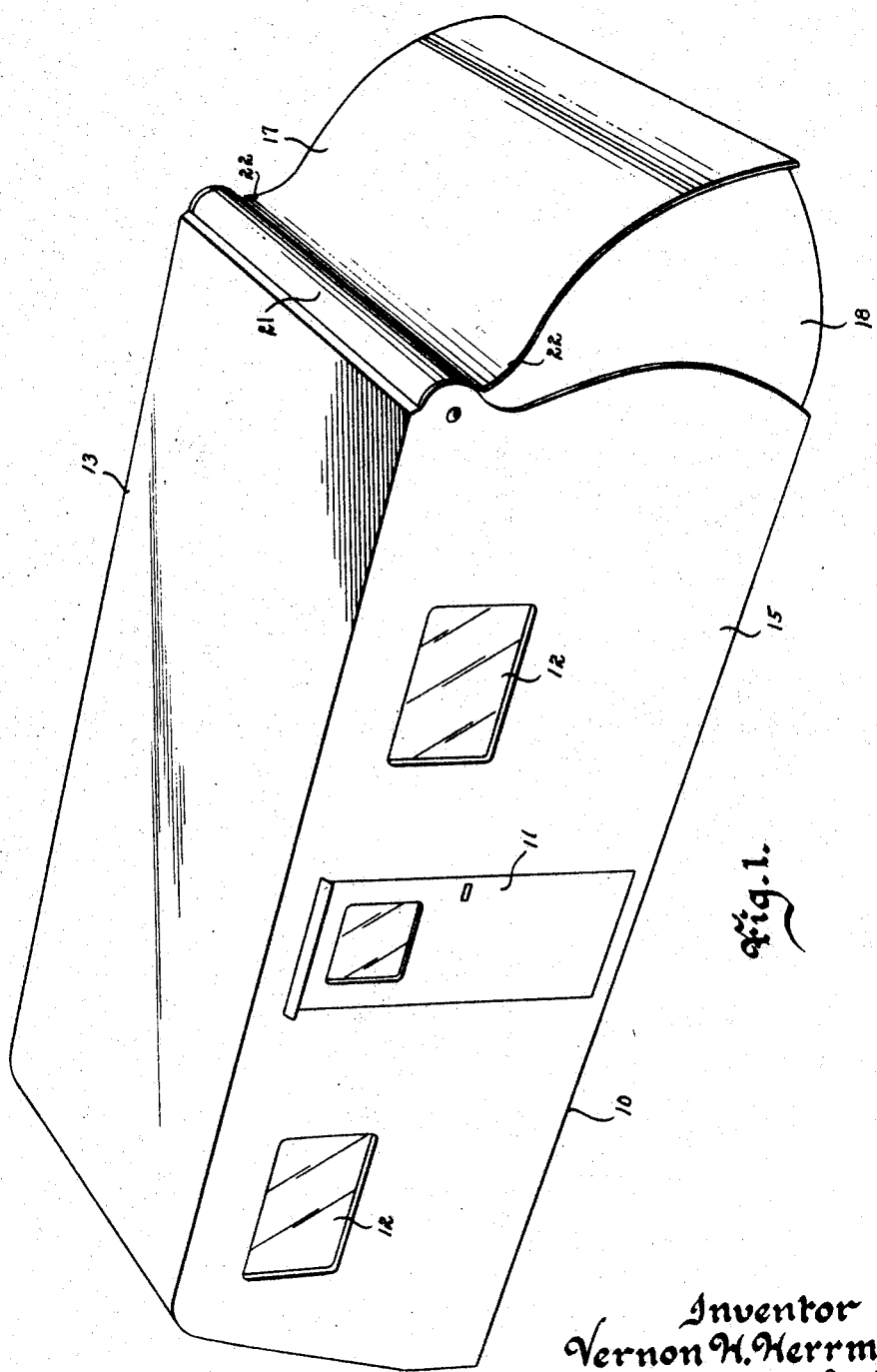
Fig. 1 is a perspective view of my trailer house.

In these drawings I show the rear end of my trailer house, expandable, but it should be understood that the invention may be applied to the front end of the housing, or to both ends of the house. Also, while I show my collapsible trailer house end as providing room for a bed, obviously, it may be used to house two beds, one above the other, of if desired the possible additional area may be used for other purposes rather than for sleeping.

I have used the numeral 10 to generally designate a trailer house having the usual doors 11, and windows 12. This housing has a top 13, bottom 14, and the two sides 15 and 16. The rear end of the housing is open and it is in association with this open end that I apply my collapsible end.

This collapsible end has a rear end wall 17, and two sides 18 and 19. The distance between the two sides 18 and 19 is slightly less than that of the distance between the house sides 15 and 16 as to slidably collapse within the two house sides 15 and 16 as shown in Fig. 2. The rear edges of the walls 15 and 16 each extend downwardly and rearwardly and then downwardly and forwardly in a curved line as shown in Fig. 1. While such a rear outline is ideal for my unit, obviously my unit may be applied to other types of rear ends of house trailers. To conform to such a trailer house rear end, the end wall 17 of my unit has its main length (when in closed condition) following this described curvature of the rear end of the housing. However, when it is extended, it will extend in a curved path, first rearwardly and downwardly and then downwardly as shown in Fig. 3, thereby providing maximum vertical space area. This desired vertical space area is lacking in most expandable trailer houses. The upper end portions of the unit's sides 18 and 19 are hinged to the inner top rear sides 15 and 16 of the house 10, by any suitable means such as a piano hinge, a shaft, of if desired by any bolt means 20 as shown. By this construction, the unit will be hinge or pivot supported at its top thereby permitting its bottom to swing outwardly away from the trailer house or inwardly toward the trailer house. Inasmuch as the sides 18 and 19 move inwardly into the house, their bottom edges are arcular to closely approach the house floor bottom 14 during their swinging movement. To provide a relatively tight fit of the upper end of my unit with the house regardless of its swinging position, I have upwardly and forwardly curved the upper end 21 of the rear wall 17 to be closely adjacent and under the roof or top 13 of the trailer house, as shown in Fig. 2 and Fig. 3. The width of the end wall 17 may be slightly greater than the distance between its side walls 18 and 19 so as to provide a flange lip 22 at each side for overlapping the rear edges of the trailer house sides 15 and 16 as shown in Fig. 1. Thus I have provided a relatively tight fit for my unit relative to the trailer house proper. A catch 23 may be used between the unit and house for holding the unit in a closed condition as shown in Fig. 2, and a latch 24 for holding the unit open as shown in Fig. 3.

As before indicated, I particularly recommend the use of at least one bed in the unit. In the drawings I show a bed frame 25 pivoted at one side to the inner side of the rear wall 17. This frame 25 may support any type of bed 26. When the unit is in expanded condition this bed means may be swung from a vertical stored condition, as shown in Fig. 2, to an effective horizontal position, as shown in Fig. 3. Any suitable means may be used for supporting the free side of the bed in a horizontal position but in the drawings I show chain lengths 27 secured to the ends of the bed respectively and the rear portion of the unit. While these limiting chains may support the bed means in a use position, they may also be employed for maintaining the bed in a vertical stored condition by hooking the chain lengths on hook members 28 at the upper rear of my unit. When my unit is in closed position, as shown in Fig. 2, the bed means will be upright and taking no material room inside the trailer house proper. The sides or wings 18 and 19 will be closely adjacent the inner sides of the trailer house and will occupy substantially no room. Therefore, with my device in collapsed condition it will not affect nor interfere with other fixtures or furniture within the main trailer house. As a matter of fact, by the use of my device, even bathroom and closets may be built in to the rear end portion of the trailer house.

When the unit is open, as shown in Fig. 3, its bottom to the rear of the trailer house flooring will be open and thereby providing an escape passageway or an easy exit and entrance means for pets. With the bed in stored condition, the opening will be most substantial. This opening may be also utilized for sweeping dirt from the trailer house or the disposal of unwanted material and objects. Inasmuch as this opening is of considerable width and depth, a tent wall or like may be made to embrace the area below my unit and thereby provide additional space for storage, use or like. When the bed is in lowered condition it will extend substantially over this opening space at the bottom of my unit, and it may be desirable at times to completely shut off this passageway area. I therefore have provided a closing board 29 hinged to the under side of the bed, as shown in the drawings.

When my unit is in closed collapsed condition, the overall length of the trailer house is relatively short, but when the unit is moved to an extended position, considerable additional room space is provided. Therefore, if desired, my trailer house structure may be mounted on a relatively short chassis. This chassis may be a pulled wheel supported one or it may be the ordinary frame chassis of a motorized vehicle.

Although I have described my unit as applied to the rear end of a trailer house, obviously it can be used to advantage in the front end or in either of the sides.

Some changes may be made in the construction and arrangement of my trailer house without departing from the real spirit and purpose of my invention, and it is my intention to cover by my claims, any modified forms of structure or use of mechanical equivalents which may be reasonably included within their scope.

I claim:

1. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a piece of house equipment in said movable means capable of substantially closing the open bottom of said movable member, and means for holding said movable member in closed and extended conditions.

2. A portable house, a house having two sides, a floor and a roof; said house having an opening, a movable unit horizontally closing the opening having its top hingedly secured to the upper portion of said house and having two sides, a wall between its two sides and with its bottom open; said movable unit capable of having its lower end swingable away from said house, and a means for holding said movable unit in a position of its swinging movement away from said house whereby the inside capacity of the house will be increased.

3. A portable house, a house having two sides, a floor and a roof; said house having an opening, a movable unit horizontally closing the opening having its top hingedly secured to the upper portion of said house and having two sides, a wall between its two sides and with its bottom open; said movable unit capable of having its lower end swingable away from said house, a means for holding said movable unit in a position of its swinging movement away from said house whereby the inside capacity of the house will be increased, and a bed hingedly secured in said movable member and capable of substantially closing the bottom of said movable member.

4. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a piece of house equipment in said movable means capable of substantially closing the open bottom of said movable member, and means for holding said movable member in closed and extended conditions; said back wall extending first outwardly and downwardly from said house and then downwardly when said movable member is in an extended swung position from said house.

5. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a bed means operatively hinged at one side to the inner side of said back wall, and means for holding said movable member in closed and extended conditions.

6. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a bed means operatively hinged at one side to the inner side of said back wall, a closing panel hinged to the outer side of said bed means, and means for holding said movable member in closed and extended conditions.

7. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a bed means operatively hinged at one side to the inner side of said back wall, a stop means for limiting the downward swinging movement of said bed means, and means for holding said movable member in closed and extended conditions.

8. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a bed means operatively hinged at one side to the inner side of said back wall, a releasable means for holding said bed means in a vertical position relative to said back wall, and means for holding said movable member in closed and extended conditions.

9. In a portable house, a house having two sides, a floor and roof; said house having an open end, a movable member having its upper end hinged to the upper portion of said house, inclosing said open end and having two sides, an open bottom and a back wall; said movable member adapted to be swung in a direction away from said house for increasing space area; said two sides of said movable member being closely adjacent the inner sides respectively of said two sides of said house when said movable member is swung to an extreme position toward said house, a bed means operatively hinged at one side to the inner side of said back wall, a releasable means for holding said bed means in a vertical position relative to said back wall; the upper portion of said back wall extending under the roof top of said house, and means for holding said movable member in closed and extended conditions.

References Cited in the file of this patent

UNITED STATES PATENTS

| | | |
|---|---|---|
| 1,796,112 | McArthur | Mar. 10, 1931 |
| 2,154,810 | Goeddertz | Apr. 18, 1939 |

FOREIGN PATENTS

| | | |
|---|---|---|
| 704,832 | Great Britain | Mar. 3, 1954 |